(12) United States Patent
Radhakrishnan et al.

(10) Patent No.: US 7,000,021 B1
(45) Date of Patent: Feb. 14, 2006

(54) ARQ (AUTOMATIC REPEAT REQUEST) FOR BROADBAND FIXED WIRELESS NETWORK

(75) Inventors: Ramesh Radhakrishnan, Saratoga, CA (US); Kushal Patel, Sunnyvale, CA (US); Ozgur Gurbuz, Santa Clara, CA (US); Ender Ayanoglu, Santa Clara, CA (US); Arun Khanna, Cupertino, CA (US); Alon Bernstein, Sunnyvale, CA (US); Cindy Chan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 09/976,627

(22) Filed: Oct. 12, 2001

(51) Int. Cl.
*G06F 15/00* (2006.01)

(52) U.S. Cl. .................. 709/230; 709/217; 709/229; 370/394; 370/473

(58) Field of Classification Search ............... 709/217, 709/229; 370/394, 473
See application file for complete search history.

(56) References Cited

U.S. PATENT DOCUMENTS

| | | | |
|---|---|---|---|
| 5,222,061 A * | 6/1993 | Doshi et al. ............... 370/394 |
| 5,629,948 A | 5/1997 | Hagiwara et al. ............. 371/32 |
| 5,784,362 A | 7/1998 | Turina ........................ 370/321 |
| 5,870,406 A | 2/1999 | Ramesh et al. ................ 371/6 |
| 6,577,642 B1 * | 6/2003 | Fijolek et al. .............. 370/465 |
| 6,697,864 B1 * | 2/2004 | Demirtjis et al. ........... 709/229 |
| 2003/0039226 A1 * | 2/2003 | Kwak .......................... 370/329 |
| 2003/0128681 A1 * | 7/2003 | Rauschmayer .............. 370/338 |

OTHER PUBLICATIONS

Data-Over-Cable Service Interface Specifications, Radio Frequency Interface Specification, SP-RFIv1.1-106-001215. Cable Television Laboratories, Inc. (2000).

* cited by examiner

*Primary Examiner*—Kamini Shah
(74) *Attorney, Agent, or Firm*—Cindy Kaplan

(57) ABSTRACT

Systems and methods for retransmitting unsuccessfully transmitted data across a communication link. The retransmission mechanism may be applied to point to multipoint networks including wireless networks. Each packet is encapsulated in an ARQ frame and assigned a sequence number for the purpose of coordinating acknowledgments and retransmissions. Information as to which packets require retransmission is communicated in the form of a bitmap where each bit indicates an acknowledgment status for a given packet. Any missing packets in the received sequence are assumed to require retransmission.

18 Claims, 14 Drawing Sheets

ARQ (AUTOMATIC REPEAT REQUEST) FOR BROADBAND FIXED WIRELESS NETWORK

BACKGROUND OF THE INVENTION

The present invention relates to data communications and more particularly to systems and methods for improving the performance of point to multipoint networks.

A point to multipoint wireless communication system represents a potentially effective solution to the problem of providing broadband network connectivity to a large number of geographically distributed points. Unlike optical fiber, DSL and cable modems, there is no need to either construct a new wired infrastructure or substantially modify a wired infrastructure that has been constructed for a different purpose. In a typical wireless point to multipoint network design, there is a central access point that provides connectivity to the Internet backbone and numerous subscriber units that interact directly with the central access point. Communication from the head end or central access point to the individual subscriber units is referred to as downstream communication. Communication from a subscriber unit to the central access point is referred to as upstream communication.

In one scenario, upstream and downstream communications use different frequencies. A time division multiple access (TDMA) scheme may be used to divide access to the upstream communication channel among the various subscriber units.

Except for the physical medium, the wireless point to multipoint network architecture just described is in fact very similar to the architecture of a cable modem network as defined by the DOCSIS standard promulgated by Cable Television Laboratories, Inc. In order to take advantage of the large body of experience in operating cable modem networks and further to be able to employ components already developed for cable modem networks, it is desirable to adapt at least the media access control (MAC) layer portion of the DOCSIS protocol to the wireless point to multipoint network while employing a physical layer that is suitable for wireless applications. The physical wireless communication channel generally represents a greater challenge than the cable channel due to noise, interference and greater multipath effects. Adapting DOCSIS to the wireless environment involves in part using a more robust physical layer such as one based on OFDM (orthogonal frequency division multiplexing).

Network protocols designed from the start for wireless communication often include a mechanism referred to as "ARQ" (Automatic Repeat Request) that provides for acknowledgment of successfully transmitted information and retransmission where there is no such acknowledgment. ARQ increases the performance of wireless communication networks in challenging channel conditions because the odds of successive transmission are greatly increased if multiple attempts are permitted. Unfortunately, DOCSIS makes no provision for ARQ in its MAC layer design. Furthermore, it is very cumbersome to include ARQ at the physical layer and still take advantage of DOCSIS MAC layer components.

What is needed are systems and methods for adapting ARQ to the DOCSIS MAC layer while making minimal changes to the DOCSIS protocol. It is also desirable to minimize overhead and capacity reduction associated with requesting retransmission and retransmitting.

SUMMARY OF THE INVENTION

Systems and methods for retransmitting unsuccessfully transmitted data across a communication link are provided by virtue of one embodiment of the present invention. The retransmission mechanism may be applied to point to multipoint networks including wireless networks. Each packet is encapsulated in an ARQ frame and assigned a sequence number for the purpose of coordinating acknowledgments and retransmissions. Information as to which packets require retransmission is communicated in the form of a bitmap where each bit indicates an acknowledgment status for a given packet. Any missing packets in the received sequence are assumed to require retransmission.

A first aspect of the present invention provides a method for operating a first node in a data communication network wherein data is transmitted from the first node to the second node. The method includes: transmitting data packets from the first node to the second node and receiving bitmap information from the second node that identifies packets to be retransmitted.

A second aspect of the present invention provides a method for operating a second node in a data communication network wherein data is transmitted from a first node in the data communication network to the second node. The method includes receiving data packets from the first node, forming bitmap information to identify data packets for which retransmission will be requested, and transmitting bitmap information to the first node to request retransmission.

Further understanding of the nature and advantages of the inventions herein may be realized by reference to the remaining portions of the specification and the attached drawings.

DESCRIPTION OF SPECIFIC EMBODIMENTS

The present invention relates to systems and methods for requesting retransmission and retransmitting lost packets across a data communication link. The term ARQ (Automatic Repeat-Request) will be used to refer to the process of correcting errors by automatically retransmitting packets that have been lost or corrupted.

The present invention will find application in, e.g., wireless systems. Wireless systems have a relatively high error rate. Forward error correction (FEC) algorithms can detect and correct errors but severely damaged packets cannot be recovered by FEC. The present invention may also find application in other physical media where errors may be corrected by retransmission. The retransmission mechanisms provided by the present invention will make the wireless channel appear to have a better signal to interference plus noise ratio (SINR) than would be measured.

The present invention finds application in e.g., networks that service TCP/IP applications where high error rates in packet transmission may be experienced. The disclosed ARQ mechanism is particularly useful in such networks since TCP assumes that lost packets have been lost due to congestion and therefore responds to packet loss by slowing its transmission rate thereby deleteriously affecting network performance. The present invention is, however, not limited to TCP/IP applications and may be used with e.g., ATM, frame relay, etc.

Representative Network Environment

Figure 1:
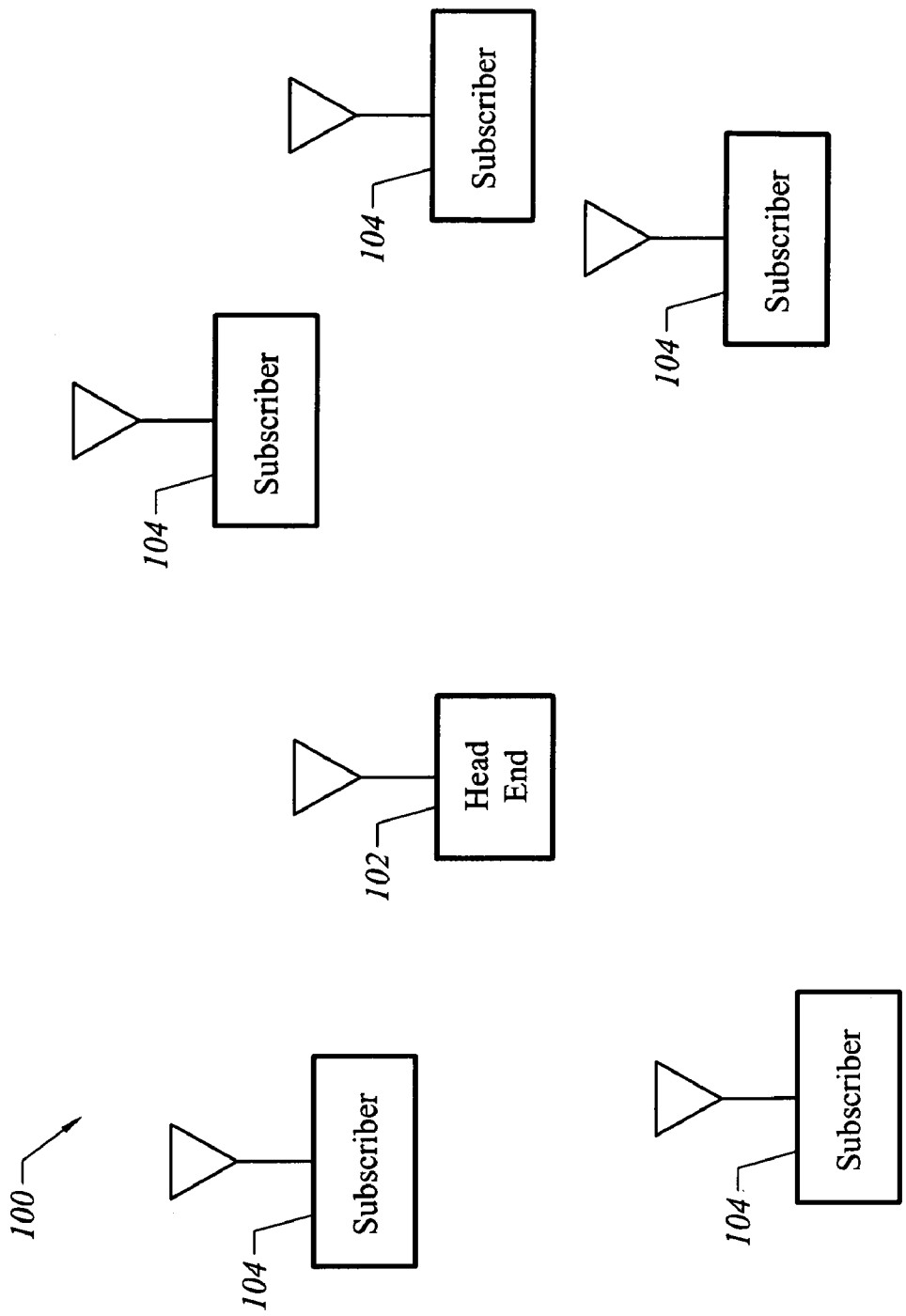
FIG. 1 depicts a point to multipoint network according to one embodiment of the present invention.

FIG. 1 depicts a point-to-multipoint wireless communication network 100 suitable for implementing one embodiment of the present invention. The present invention is, however, not limited to wireless networks or to point-to-multipoint networks. Network 100 includes a central access point or head end 102 and multiple subscriber units 104. All communication is either to or from central access point 102. Communication from central access point 102 to one or more subscriber units 104 is herein referred to downstream communication. Communication from any one of subscriber units 104 to central access point 102 is herein referred to upstream communication. In one embodiment, different frequencies are allocated to upstream and downstream communication. This is referred to as frequency division duplexing (FDD). Alternatively, time division duplexing (TDD) may be employed where upstream and downstream communications share the same frequencies. Although the point to multipoint network is used to describe an exemplary embodiment, the present invention may also be applied to, e.g., point-to-point networks, peer-to-peer networks, mesh networks, etc.

In one embodiment, both upstream communication and downstream communication are coordinated in accordance with the medium access control (MAC) layer protocol defined by the DOCSIS v1.1 standard as described in the Data-Over-Cable Service Interface Specifications, Radio Frequency Interface Specifications, SP-RFI v1.1 06-001215, (Cable Television Laboratories 2000), the contents of which are herein incorporated by reference in their entirety. Alternatively, network 100 may employ the DOCSIS v1.0 standard as described in the Data-Over-Cable Service Interface Specifications, Radio Frequency Interface Specification, SP-RFI v1.1 04-980724 (Cable Television Laboratories, 1997), the contents of which are herein incorporated by reference in their entirety. These different DOCSIS specifications are collectively referred to as the "DOCSIS specifications" or simply "DOCSIS" or individually as "DOCSIS v1.0" or "DOCSIS v1.1".

The DOCSIS specifications define a MAC layer protocol that finds application not only in data-over-cable networks but also in wireless networks. For upstream transmission, DOCSIS defines a time domain multiple access (TDMA) scheme where the time domain is divided into "minislots" that are allocated for use by individual subscriber units 104 under the control of central access point 102. DOCSIS also defines physical layer protocols for data-over-cable networks. In a wireless network, it is advantageous to combine a MAC layer along the lines of DOCSIS with a physical layer system based on orthogonal frequency division multiplexing (OFDM). This type of system has been found to better handle the challenges presented by wireless communication channels such as multipath reflections and resulting intersymbol interference.

ARQ Over DOCSIS Overview

The DOCSIS standards do not incorporate ARQ functionality. According to one embodiment of the present invention, ARQ may be provided to both upstream and downstream communications in a point-to-multipoint network operating in accordance with DOCSIS. The description of the ARQ system will assume two nodes: a "sender" and a "receiver." The term "sender" as used here refers to a node that is transmitting data, receiving acknowledgments, and retransmitting as appropriate. The term "receiver" refers to a node that receives data and requests retransmission as appropriate. It will be appreciated that in the DOCSIS example, downstream communication involves the central access point operating as a sender and numerous subscriber units operating as receivers while for upstream communication, the subscriber units are the senders and the central access point is the receiver. For the downstream ARQ scenario acknowledgments flow upstream while for upstream ARQ processing acknowledgments flow downstream.

In one embodiment of the present invention, DOCSIS packets are transmitted encapsulated with an ARQ header that includes a sequence number used for coordinating retransmission. Both the sender and receiver operate buffers. The sender buffer keeps a copy of a limited number of transmitted packets until confirmation acknowledgment is received from the receiver. The receiver buffers out-of-sequence packets until in-sequence delivery can be provided. The receiver confirms received packets and notifies the sender of missing packets via acknowledgment packets that are sent upon expiration of a periodic receiver timer or upon receipt of an explicit acknowledgment request from the sender. The sender transmits only missing packets requested by the receiver.

For full reliability, the ARQ system may be configured so that the sender may repeat requests for retransmission of missing packets and for acknowledgments an infinite number of times. Partial reliability may also be implemented by assigning finite values to a retry limit. A partial reliability implementation requires less memory.

Figure 2:
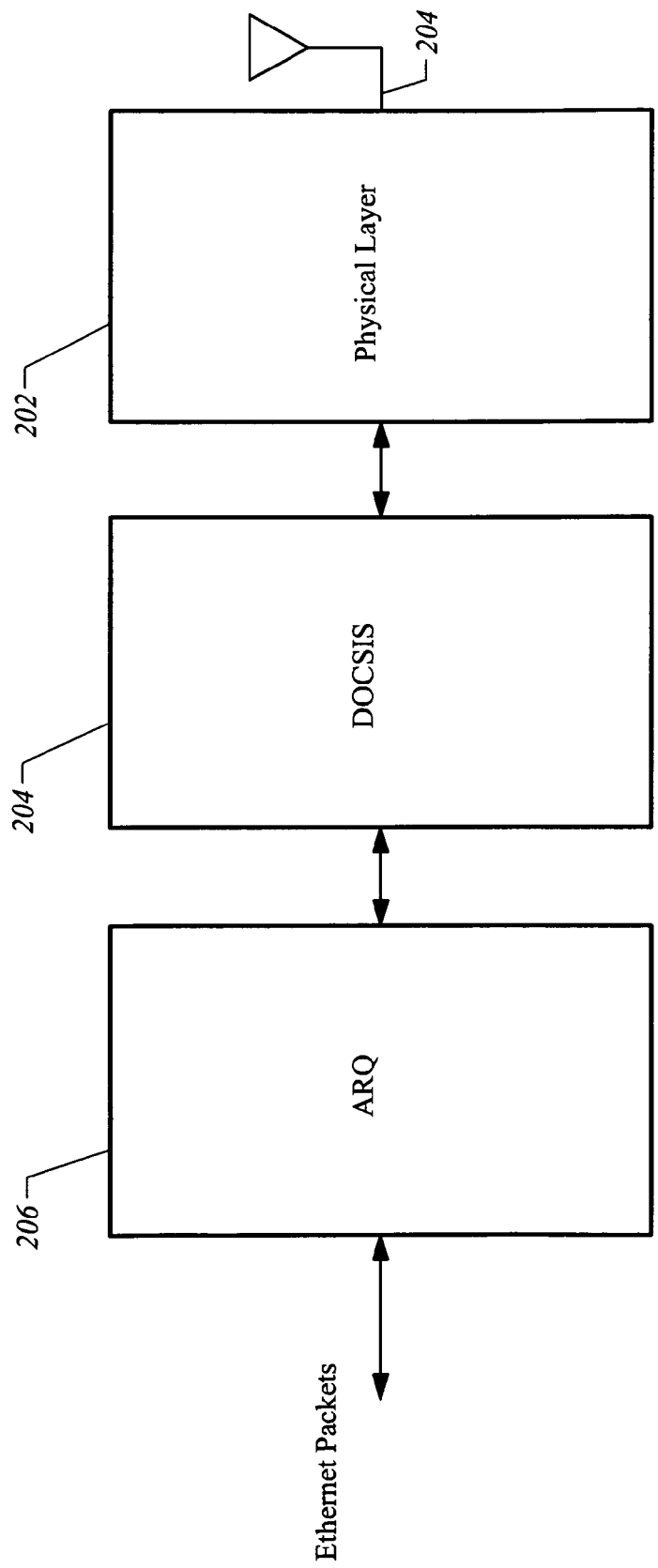
FIG. 2 depicts functional layers of a node in the network of FIG. 1 according to one embodiment of the present invention.

FIG. 2 depicts data flow at a representative node of network 100, either central access point 102 or any one of subscriber units 104. A physical layer block 202 is coupled to an antenna 204 or multiple antennas as appropriate. Physical layer block 202 applies error correction coding to DOCSIS packets and uses the encoded packets contents to modulate a signal for over-the-air transmission. Similarly, signals received over the error are demodulated and decoded to obtain received DOCSIS packets. Physical layer block 202 may operate according to an OFDM scheme. In one embodiment, there is a relationship between DOCSIS packets and OFDM bursts.

A DOCSIS block 204 performs medium access control functions in accordance with the relevant DOCSIS standard and appropriate to the node's role as either a central access point or a subscriber unit. DOCSIS block 204, if installed at central access point 102, allocates upstream transmission bandwidth among the multiple subscriber units 104 and generates control and scheduling messages to send downstream. If installed at one of subscriber units 104, DOCSIS block 204 requests slots for transmitting data upstream and times its transmissions to coincide with assigned slots.

DOCSIS blocks 204 receives packets to be sent from an ARQ block 206 that supplements the DOCSIS packet format with an ARQ header as will be described. ARQ block 206 adds this ARQ header to packets to be sent and strips the header away from packets that are received. ARQ block 206 also operates the buffers necessary for the node to operate as both a sender and a receiver in the ARQ scheme described below. ARQ block 206 specifies the contents of special ARQ control packets such as acknowledgments and requests for acknowledgments and maintains certain timers to support ARQ operation.

ARQ block 206 exchanges Ethernet packets with higher layer protocol entities. For packets to be sent, ARQ block 206 adds the ARQ header and DOCSIS block 204 adds the header specified by DOCSIS. Similarly, for packets that are received, the DOCSIS header information is stripped by DOCSIS block 204 and the ARQ header is stripped by ARQ block 206 with the remaining information being formatted into Ethernet packets to be forwarded to higher layer protocol entities. Further details of a specific packet format are presented below.

Figure 3:
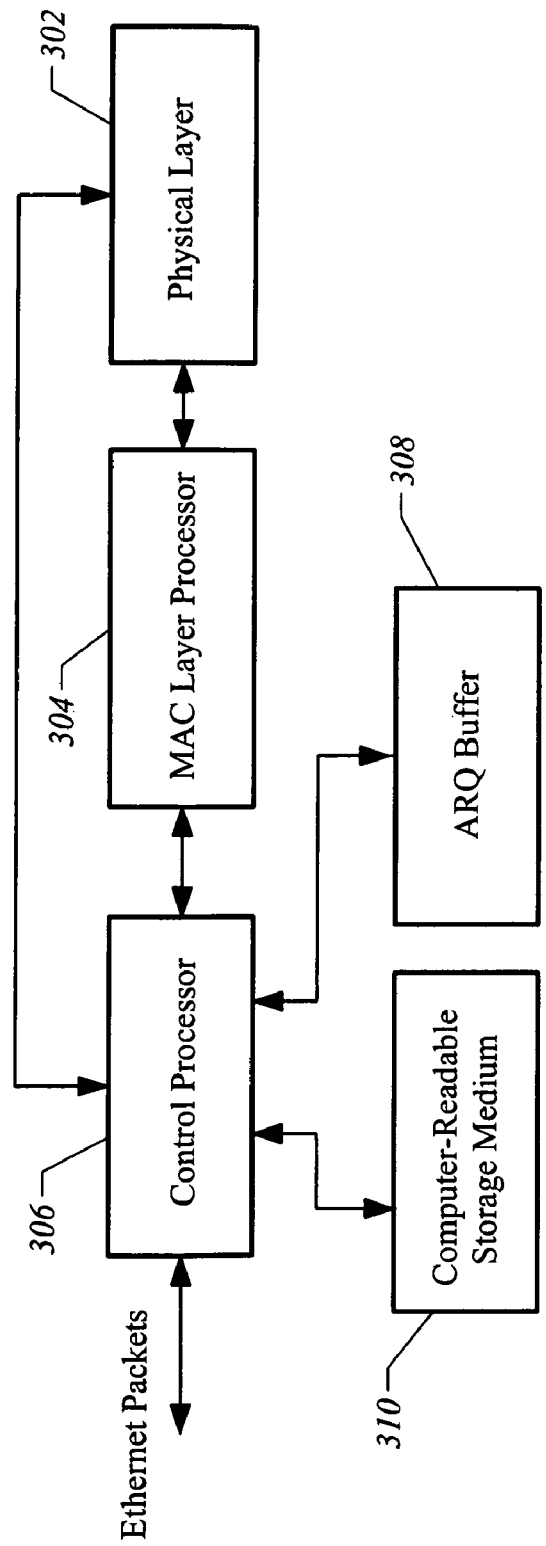
FIG. 3 depicts representative hardware of a node in the network of FIG. 1 according to one embodiment of the present invention.

FIG. 3 depicts representative hardware according to one embodiment of the present invention for implementing the architecture depicted in FIG. 2. A physical layer unit 302 performs error correction decoding and encoding, OFDM burst processing, channel estimation and equalization, conversion between digital and analog signals, conversion between intermediate frequency (IF) signals and baseband analog signals, conversion between IF signals and radio frequency (RF) signals, low noise amplification of received signals, and amplification of transmitted signals to a desired transmission power level. A MAC layer processor 304 performs DOCSIS-related operations to support operation of the MAC layer.

A control processor 306 performs ARQ operations and may also perform various other operations related to operation of the wireless communication system such as monitoring wireless link performance and configuring various MAC layer and physical layer parameters. Control processor 306 also interfaces with higher layer applications that source and sink Ethernet packets. To support ARQ operations, control processor 306 may employ a memory device that implements an ARQ buffer 308 to provide intermediate storage of sent and received packets as will be explained below.

Control processor 306 may be implemented in any suitable manner such as custom logic, field programmable gate array (FPGA), general purpose microprocessor, programmed digital signal processor, etc. Control processor 306 may execute software instructions in, e.g., any suitable machine language or high level programming language. Instructions for execution by control processor 306 may be stored on a computer-readable storage medium 310. Storage medium 310 may represent a memory device such as a random access memory (RAM) device, magnetic storage medium, an optical storage medium, etc. Instructions stored on storage medium 310 may be loaded from another storage medium, such as, e.g., a compact disc, (CD), a digital video disc (DVD), a floppy disc, etc. Another example of loading instructions from a storage medium is downloading software from a network.

An implementation of the present invention will now be discussed in greater detail. Operation at the sender will be discussed first followed by operation at the receiver. In describing the details of ARQ operation, it will be useful to first define parameters maintained by the receiver and/or sender:

| | |
|---|---|
| $T_r$ | Acknowledgment request timer |
| $T_a$ | Periodic acknowledgment timer |
| $T_f$ | Frame flush timer |
| $R_t$ | Maximum number of retries for transmitting a packet |
| $R_r$ | Maximum number of retries for acknowledgment request packets |
| $W_t$ | Transmit window size |
| $W_r$ | Receive window size |
| $F_t$ | Sequence number of first unacknowledged packet |
| $L_t$ | Sequence number of last transmitted packet |
| $F_r$ | Sequence number of first packet not received |
| $L_r$ | Largest sequence number received |
| $C_r$ | Sequence number of last received packet |
| $F_{r, new}$ | New value of $F_r$ |
| $C_{r, prev}$ | Previous value of $C_r$ from when the previous acknowledgment was sent |
| $L_{r, init}$ | End of the receiver window when the flush timer was started |

ARQ Operation at Sender

Figure 4:
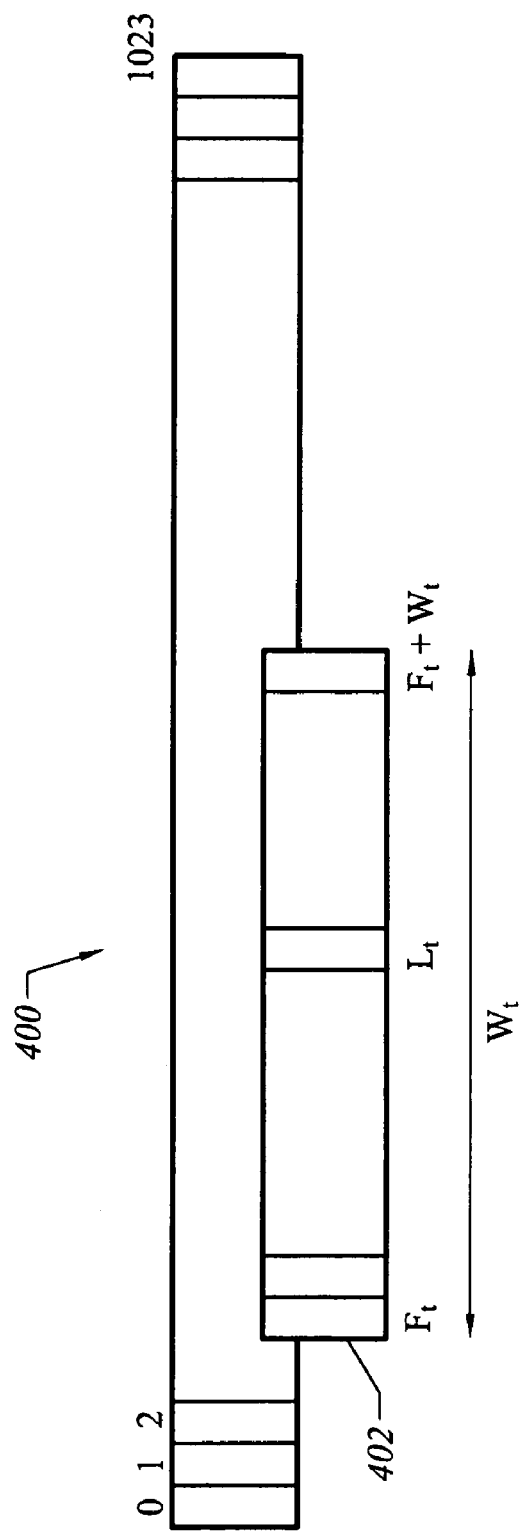
FIG. 4 depicts operation of a sender retransmission buffer according to one embodiment of the present invention.

FIG. 4 depicts structure of a buffer 400 maintained by a sender to store packets for retransmission if necessary. In a point to multipoint architecture, central access point 102 will typically maintain a separate buffer for each subscriber unit or potentially for each DOCSIS v1.1 service flow for which ARQ is enabled. (In DOCSIS v1.1, multiple applications running often have their own service flows operating at the MAC layer.) Service flows handling voice or other real-time traffic typically do not employ ARQ due to the imposed latency. At the subscriber unit, only a single buffer 400 or a single buffer 400 per ARQ-enabled service flow may be needed because all communication is typically with a single central access point. Buffer 400 includes storage locations 0–1023. Packets that have been sent are stored in a location that reflects their sequence number as assigned by the ARQ process. ARQ processing, however, focuses on a window 402 within buffer 400. Window 402 includes $W_t$ packets and begins at the sequence number of the first unacknowledged packet $F_t$.

Details of sender ARQ operation will be described with reference to flow charts describing the response of the sender ARQ process to various events such as receipt of an Ethernet packet to be transmitted over the link, receipt of an acknowledgment packet from the receiver, and expiration of the acknowledgment request timer, $T_r$.

Figure 5:
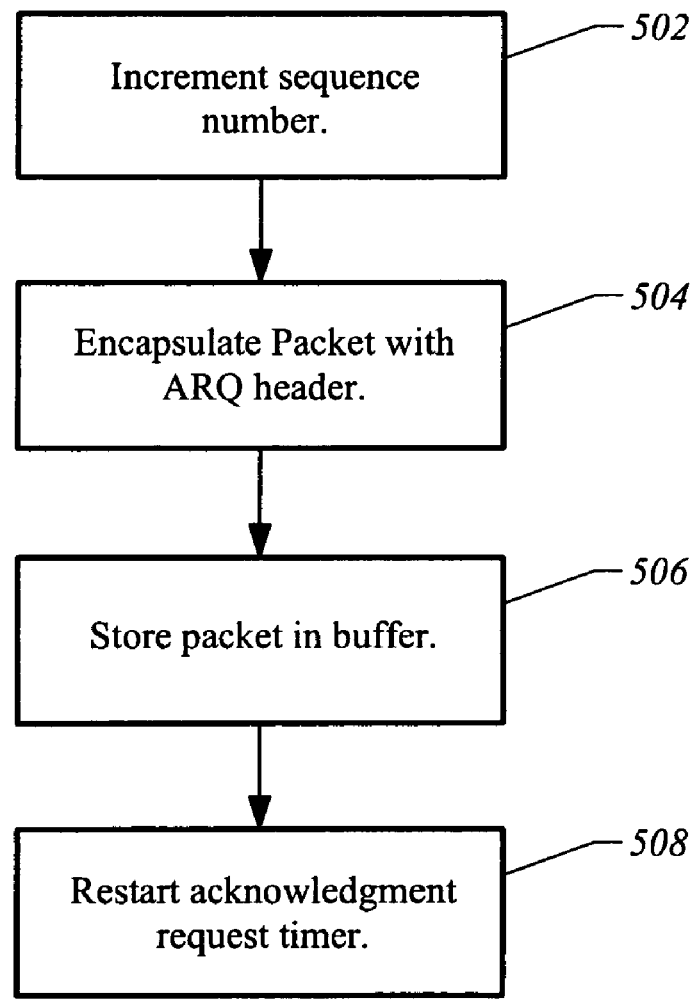
FIG. 5 is a flowchart describing steps of handling a packet to be transmitted according to one embodiment of the present invention.
Figure 6:
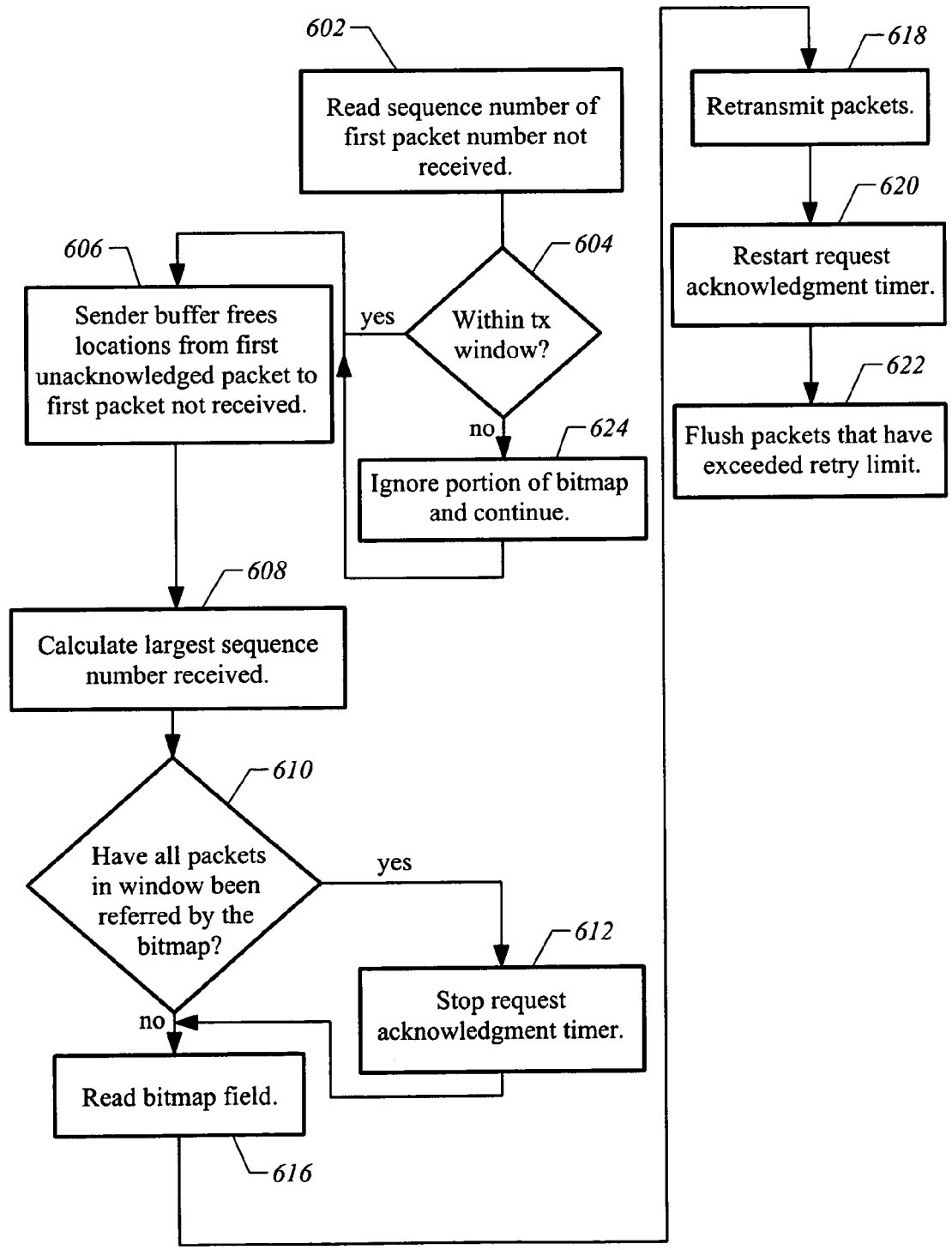
FIG. 6 is a flowchart describing steps of handling a received acknowledgment according to one embodiment of the present invention.

FIG. 5 is a flow chart describing steps of handling a packet to be transmitted to the receiver side. At step 502, a current sequence number, $L_t$ is incremented. Once a sequence number reaches a maximum value, e.g., 1023, it will wrap around to 0. At step 504, the packet is encapsulated by appending an ARQ header that includes the current sequence number. At step 506, the packet to be transmitted is stored in buffer 400 at the address specified by $L_t$. If buffer 400 is full, the packet is queued for future transmission. If the hold queue used for this purpose is full, the packet is discarded. At step 508, an acknowledgment request timer is started or reinitialized if it is already active. As will be described below, expiration of the acknowledgment request timer may cause the sender to request acknowledgment for packets that have been sent but not acknowledged by the receiver for a predetermined time interval FIG. 6 is a flow chart describing steps of responding to an acknowledgment from the receiver. The acknowledgment packet will include a sequence number of the first packet detected as missing at the receiver, i.e., the lowest sequence number gap in the packets received so far. At step 602, this value, $F_r$, is read from the acknowledgment packet. At step 604, the $F_r$ value is checked to be within the current window 402. If the sequence number is within the window 402, then ARQ processing proceeds to a step 606 where the sender moves the lower boundary of the window from its current value of $F_t$ to a new value of $F_r$, i.e., $F_t$ is updated to be $F_r$. The packets between the window's old boundary and new boundary have been implicitly acknowledged by the receiver as being correctly received.

The acknowledgment packet will also include a bitmap that identifies bit by bit which packets in the receiver's window have been correctly received and which ones are missing. At step 608, the sender calculates $L_r$, which represents the highest sequence number packet which has been correctly received at the receiver. This computation is based on $F_r$ and the bitmap length. At step 610, the sender determines whether all of the packets now in window 402 have been referred by the bitmap, i.e., have been identified as either received or missing by the bitmap. This is done by comparing $L_r$ to $L_t$, the sequence number of the last sent packet. If $L_r$ equals $L_t$, the acknowledgment request timer $T_r$ is stopped at step 612 because acknowledgment information has been received for all buffered packets. After step 612, or after a finding that $L_r$ is less than $L_t$, indicating that there are some packets for which acknowledgment information is not yet available, step 614 reads the bitmap field from the acknowledgment packet. Then, at step 616, starting from address $F_r$, the missing packets indicated by zeros in the bitmap are retransmitted.

In the full reliability mode, an infinite number of retries are available for each packet. Alternatively, in the partial reliability configuration, there are individual retry counters for each packet.

At step 618, the packets are retransmitted so long as the number of retries has not exceeded the limit, $R_r$. After the last packet retransmission, the acknowledgment request timer, $T_r$, is reinitialized at step 620. At step 622, if the retransmission limit for the packet at address at address $F_r$ has been reached, the packets are flushed from the location of $F_r$ until the location of the next missing sequence number that has not yet exhausted retries. $F_t$ is then updated to move the window edge to this location. Step 622 is preferably skipped in the full reliability configuration.

If at step 604 the $F_r$ value was determined to be outside the current window and therefore invalid, processing proceeds to a step 624, where the bitmap from $F_r$ up to $F_t$ is removed and processing continues at step 606 as described above. If step 624 is reached, this indicates that the link has gone down and back up leading to a loss of synchronization between the sender and receiver windows.

Figure 7:
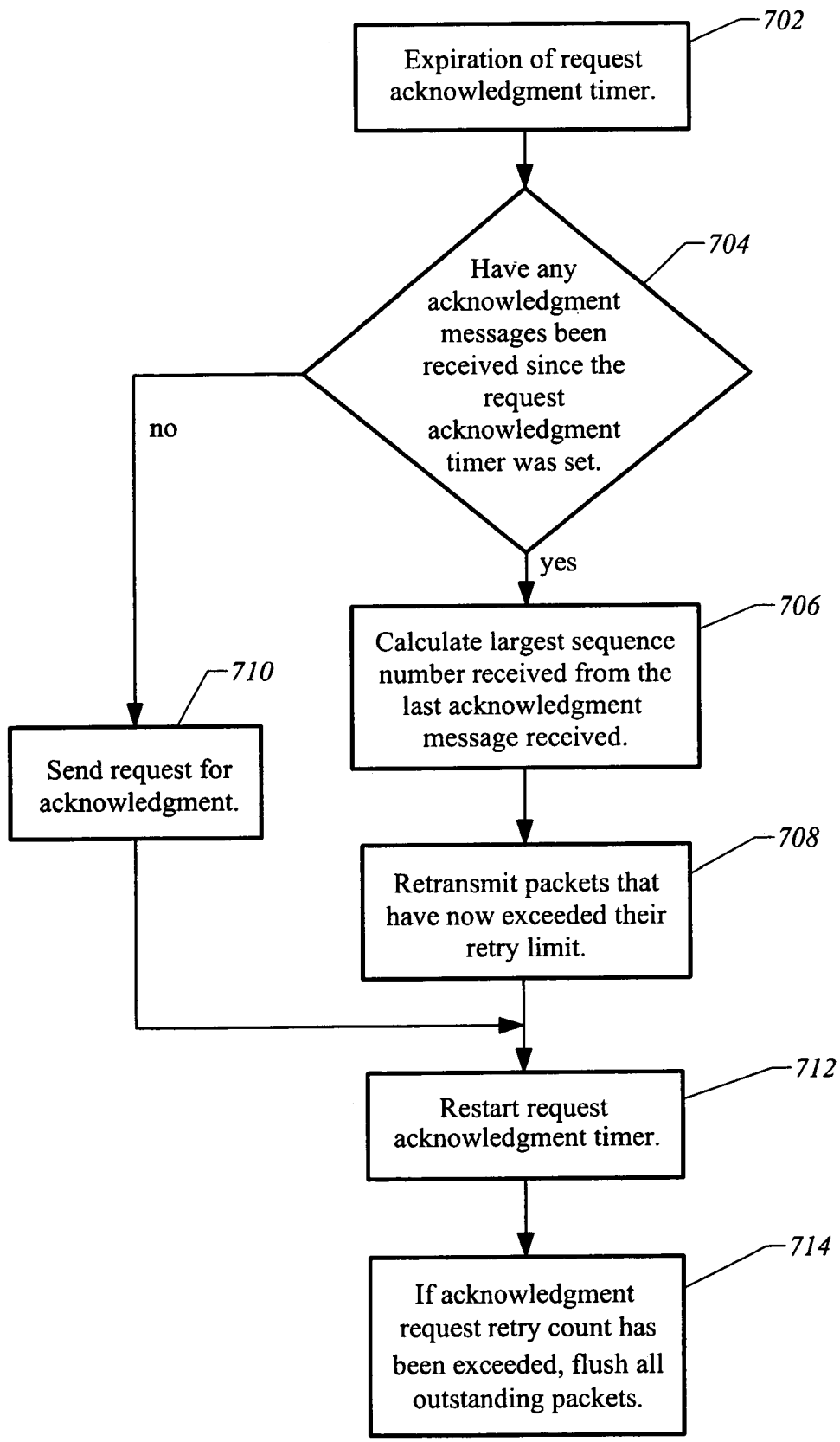
FIG. 7 is a flowchart describing steps of responding to expiration of an acknowledgment request timer according to one embodiment of the present invention.

FIG. 7 is a flow chart describing steps of responding to the expiration of the acknowledgment request timer. At step 702 the acknowledgment request timer, $T_r$, expires. A step 704 tests whether any acknowledgment messages have been received since the acknowledgment request timer was set. If acknowledgment packets have been received, then processing proceeds to step 706 where the largest sequence number received at the receiver is determined based on the contents of the last received acknowledgment packet. Then at step 708, the packets from addresses $L_r$, to $L_t$ are retransmitted if their retry counters have not exceeded any imposed retry limit.

If step 704 determines that no acknowledgment packets have been received since the acknowledgment request timer was set, an acknowledgment request is sent at step 710 to the receiver. However, in a partial reliability configuration, there may be a retry limit for acknowledgment requests, $R_r$, and the acknowledgment packet is sent at step 710 only if this limit is not exceeded.

Following either step 708 or step 710, the acknowledgment request timer is reinitialized at step 712. At step 714, if an acknowledgment request retry count has been exceeded, all packets in the transmitter buffer are flushed. This will typically occur only in very difficult link conditions. Step 714 is preferably skipped in a full reliability configuration.

Receiver ARQ Operation

Figure 8:
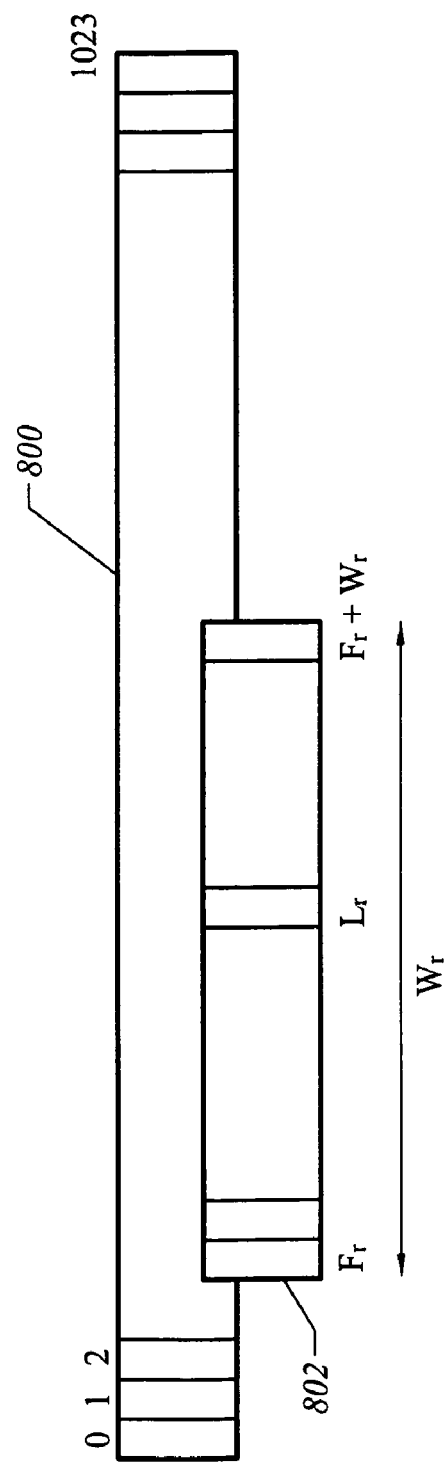
FIG. 8 depicts operation of a receiver retransmission buffer according to one embodiment of the present invention.

FIG. 8 depicts a receiver ARQ buffer 800. As on the sender side, ARQ operations are concentrated in a window 802. Window 802 extends from the address of the first missing packet, $F_r$, up until $F_r+W_r$. Each subscriber unit (or subscriber unit service flow in DOCSIS v1.1) will typically operate one buffer 800 and window 802 whereas the central access point will operate independent buffers and windows for each subscriber unit or service flow.

Figure 9:
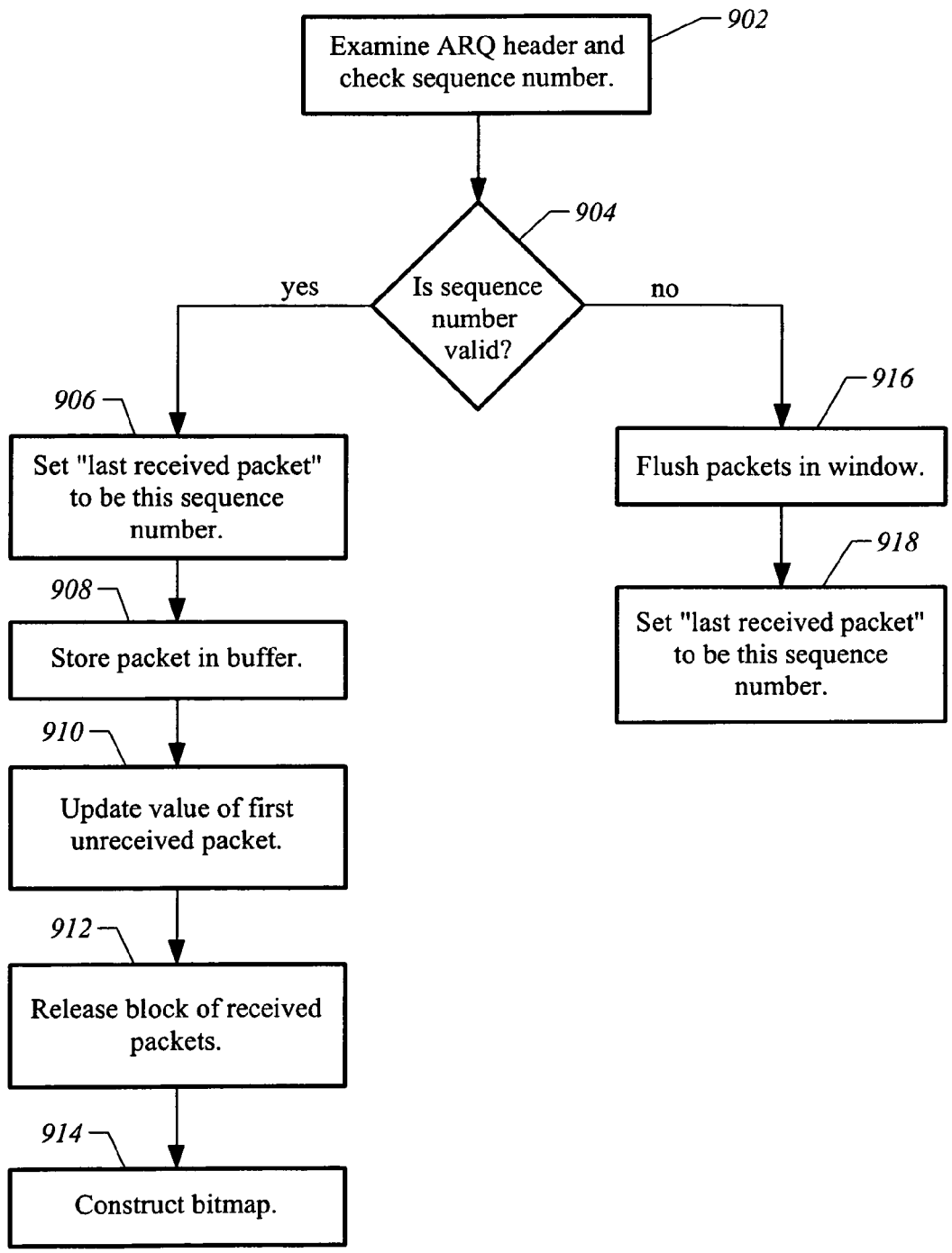
FIG. 9 is a flowchart describing steps of handling a received packet according to one embodiment of the present invention.

FIG. 9 is a flow chart describing the steps of handling each packet that is received from the sender. When a first packet is received, a periodic acknowledgment timer, $T_a$ is started. At step 902, the ARQ header of the received packet is examined and the sequence number is checked. A step 904 tests whether the sequence number is valid. The sequence number is valid if it falls within the received window boundaries. If the sequence number is valid, it is stored as $C_r$ at step 906. At step 908, the packet is stored in buffer 800 at the address specified by its sequence number. At step 910, the window is examined to identify the missing packet (as indicated by a gap in the sequence) with the lowest sequence number. The sequence number of this first missing packet is stored as $F_{r,\ new}$. Now the packets from $F_r$ to $F_{r,\ new}$ are known to have all been received correctly and in sequence, and they are forwarded to a higher level application at step 912. Also, $F_r$ is updated to equal $F_{r,\ new}$ thus shifting the boundary of window 802.

At step 914, the contents of the redefined received window are examined and a bitmap is constructed to mark the locations of missing packets. A "0" in the bitmap indicates a missing packet while a "1" shows a correctly received packet. The first bit of the bitmap is "0", the second bit indicates the status of the packet expected at sequence number $F_r$. Trailing zeros are preferably not included in the bitmap so that the bitmap has a variable length and the last bit corresponds to sequence number $L_r$.

If step 904 determines the sequence number is not valid, all packets in the current window are flushed at step 916 and $F_r$ is set to the sequence number of the received packet at step 918. This addresses the situation that may arise when the sender and receiver windows become unsynchronized, e.g., when the link goes down and comes back up.

Figure 10:
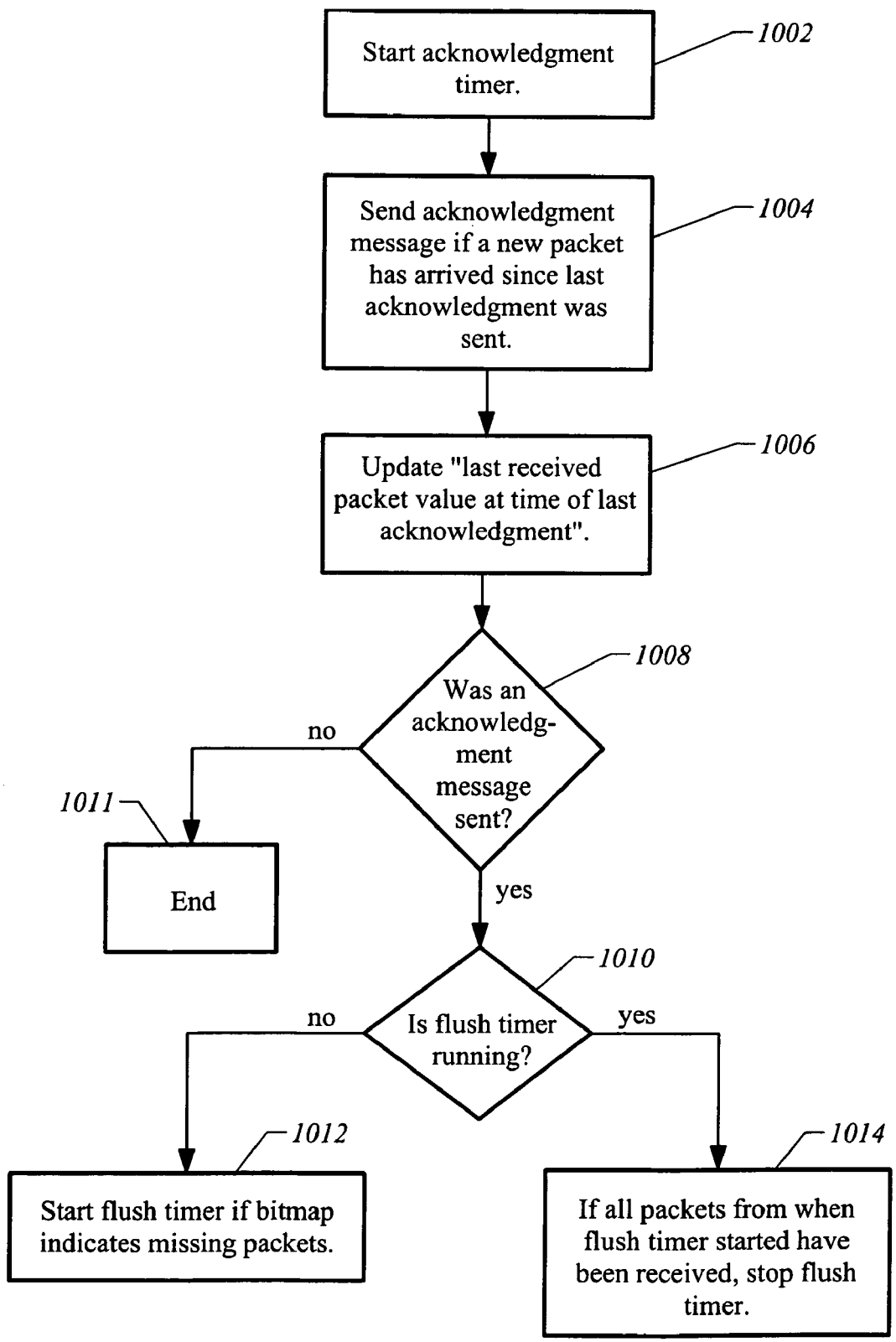
FIG. 10 is a flowchart describing steps of handling expiration of an acknowledgment timer according to one embodiment of the present invention.

FIG. 10 is a flow chart describing steps of responding to expiration of the periodic acknowledgment timer, $T_a$. At a step 1002, the acknowledgment timer is restarted to maintain periodicity in transmission of acknowledgment packets. If a new packet has arrived since the last acknowledgment was sent out or if the receive window is nonempty and therefore contains sequence numbers for which no packet was received, an acknowledgment packet is transmitted at step 1004. Whether a new packet has arrived since the last acknowledgment was sent is determined by comparing $C_r$ to $C_{r, prev}$. These values are unequal if a new packet has arrived since the last acknowledgment was sent. The transmitted acknowledgment packet includes the latest bitmap that was generated in accordance with FIG. 9. In one embodiment, the bitmap is run-length coded as known in the art to provide even further compression.

At step 1006, $C_{r, prev}$ is updated to the value of $C_r$. Next, the ARQ process updates the flush timer, $T_f$, which is maintained in the partial reliability configuration. The flush timer is used to support discarding of packets that have remained in the buffer for a long time. Details for responding to flush timer expiration will be discussed with reference to FIG. 12. A step 1008 tests whether an acknowledgment packet was sent at step 1004. If an acknowledgment packet was sent at step 1004, a step 1011 terminates the response to expiration of the acknowledgment timer. If the acknowledgment packet was sent, a step 1010 tests whether the flush timer, $T_f$, is currently running. If the flush timer is not running and the current bitmap indicates that there are missing packets, then the flush timer is initialized at step 1012. Also at step 1012, $L_r$, the end sequence number of the current received window is stored as $L_{r, init}$. If the flush timer is already running, at step 1014, the current $F_r$ is compared to $L_{r, init}$. If $F_r$ is greater than $L_{r, init}$, the flush timer is stopped. This is an indication that all of the packets in the window at the time the flush timer was started have been received and the flush timer is not needed anymore.

Figure 11:
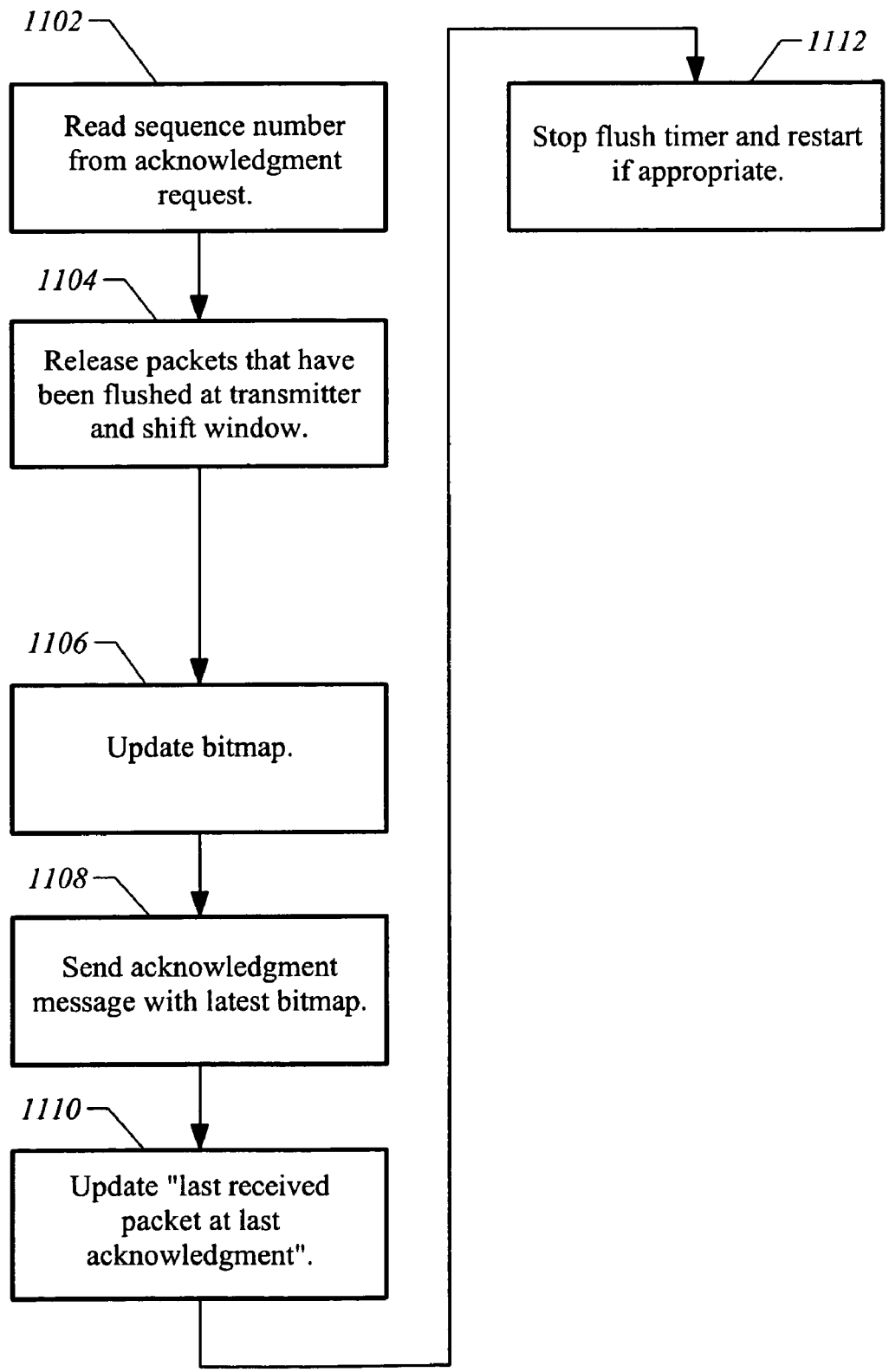
FIG. 11 is a flowchart describing steps of handling expiration of a flush timer according to one embodiment of the present invention.

FIG. 11 is a flow chart describing steps of responding to an acknowledgment request packet according to one embodiment of the present invention. At step 1102, the sequence number field, $F_t$, is read from the acknowledgment request packet. At step 1104, all packets from $F_r$ to $F_t$ are released or flushed. This accommodates the situation that may arise in the partial reliability configuration where the sender may have flushed some packets upon reaching retry limits and the receiver could still be waiting for them. In a full reliability configuration, $F_r$ should always be equal to $F_t$. A step 1106 updates the bitmap in accordance with the shift in the window boundary. In response to the sender's request, step 1108 sends an acknowledgment packet with the latest bitmap. At step 1110, the value of $C_{r, prev}$ is updated to be $C_r$. At step 1112 the flush timer $T_f$ is stopped. It is reinitialized only if the buffer is non-empty and there are missing packets.

Figure 12:
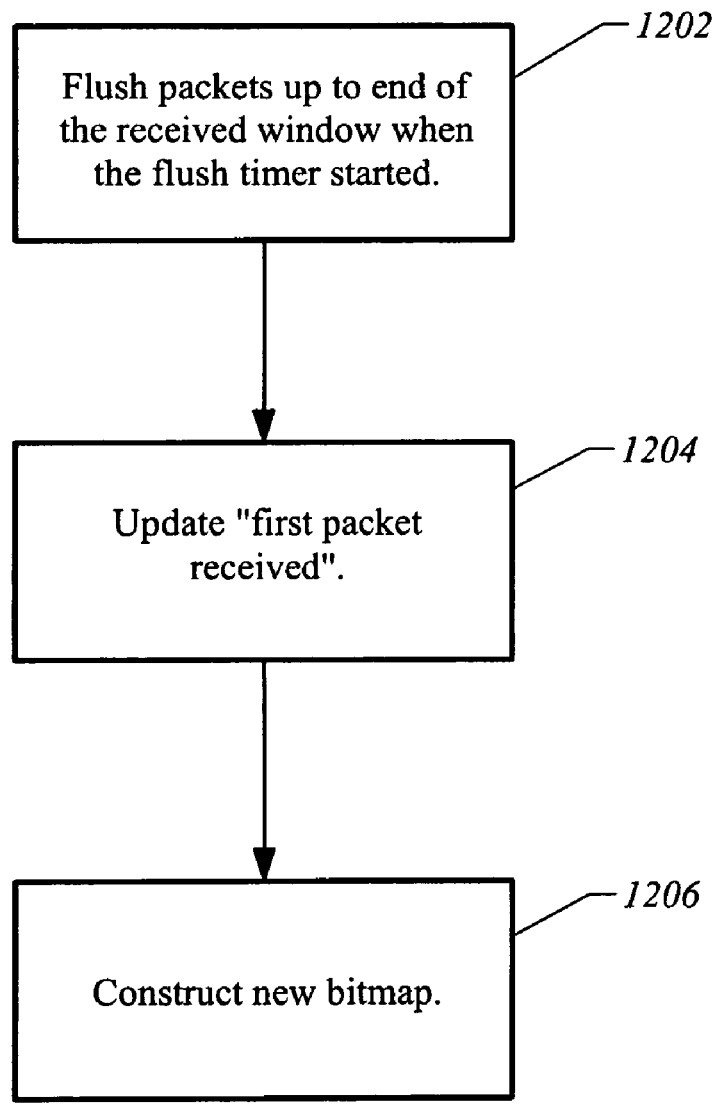
FIG. 12 is a flowchart describing steps of handling receipt of an acknowledgment request according to one embodiment of the present invention.

FIG. 12 is a flow chart describing steps that occur upon expiration of the flush timer, $T_f$, in the partial reliability configuration. At step 1202, the ARQ process flushes packets from $F_r$ up to and including $L_{r, init}$ which indicates the end of received window 802 at the time of the flush timer started. At step 1204, the bottom edge of the window is moved up by updating the value of $F_r$. A new bitmap is constructed at step 1206 based on the new configuration of window 802.

ARQ Packet Format

Figure 13:
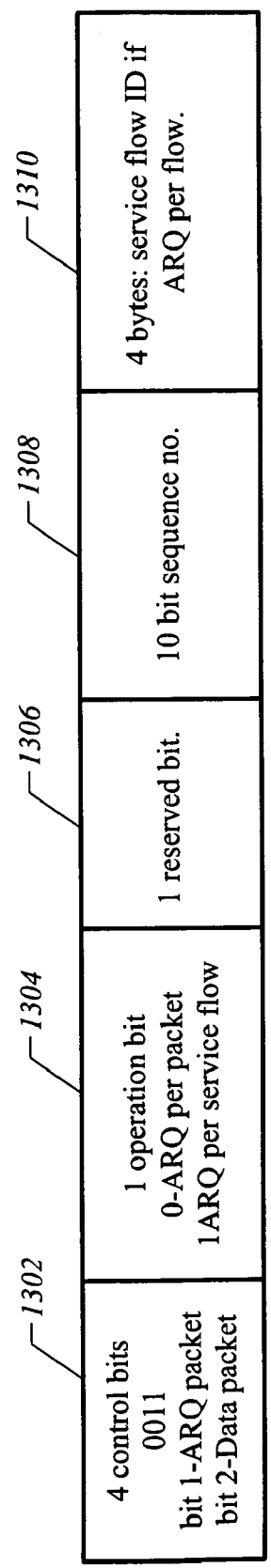
FIG. 13 depicts a data packet format according to one embodiment of the present invention.

FIG. 13 depicts an ARQ header format as may be used to encapsulate data packets according to one embodiment of the present invention. The ARQ header may be included as part of the DOCSIS Extended Header (EHDR) for an Ethernet packet. A reserved EH (Extended Header) type value may be allocated to identify the ARQ header. A control field 1302 includes four control bits. Within control field 1302, bit 1 identifies the packet as one that is used in ARQ processing. Bit 2, if set, identifies the packet as an ARQ data packet as opposed to an ARQ control packet. An operation bit field 1304 includes one operation bit. The operation bit indicates whether or not the ARQ process operates on a per-subscriber unit or on a per-service flow basis as is possible with DOCSIS v1.1. In one embodiment, a reserved field 1306 includes a single bit that is left unused. A sequence number field 1308 includes a ten bit sequence number. A service flow ID field 1310 is allocated four bytes to identify a particular service flow if ARQ is being managed on a per flow basis.

Figure 14:
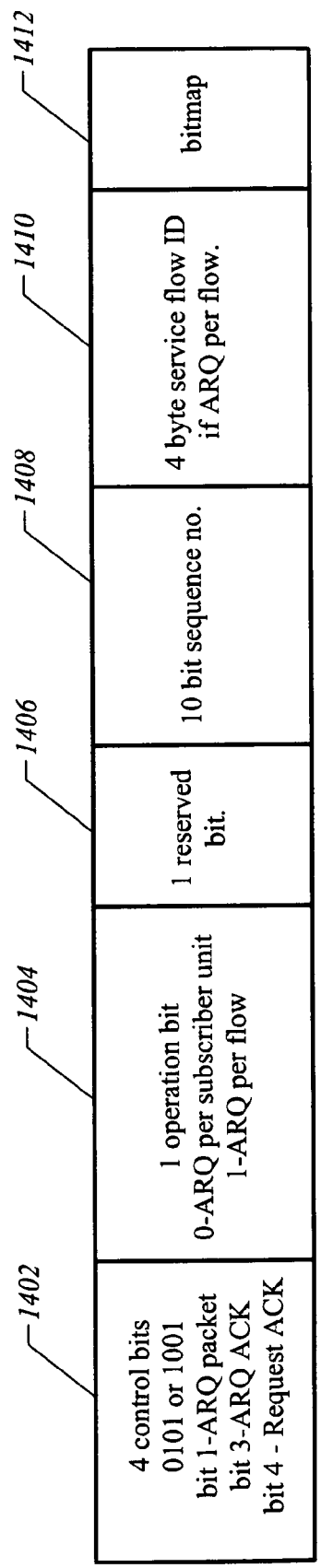
FIG. 14 depicts a control packet format according to one embodiment of the present invention.

FIG. 14 depicts a header format that may be used to implement acknowledgment and acknowledgment request packets according to one embodiment of the present invention. A four bit control field 1402 includes a bit 1 which would be set to indicate that this is an ARQ-related packet, a bit 3 which would be set to indicate that this packet is an acknowledgment packet, and a bit 4 that would be set to indicate that this packet is an acknowledgment request packet. An operation bit field 1404 includes a single bit that indicates whether ARQ is being operated per-subscriber unit or per-service flow. In one embodiment, a reserved bit field 406 includes a single unused bit. A field 1408 holds a ten bit sequence number. If this is an acknowledgment packet, the sequence number stored here represents $F_r$. If the packet is an acknowledgment request, the sequence number represents $F_t$. A field 1410 holds a 4-byte service flow ID if the ARQ process is operating per service flow. A bitmap field 1412 includes the bitmap if the packet is an acknowledgment. The bitmap may optionally be run-length encoded.

In a representative embodiment, the various timers are set with the following values upon initialization or reinitialization:

$T_a$ 50 ms
$T_r$ 500 ms
$T_f$ 2 s

The ARQ systems and methods that have been described greatly enhance the functionality of wireless systems by providing for error-free communication even when channel impairments corrupt data to the extent that error correction decoding cannot recover what has been transmitted. ARQ may be added to a DOCSIS-based system with minimal overhead. Acknowledgment overhead is minimized and either full or partial reliability configurations may be implemented depending on available memory resources.

It is understood that the examples and embodiments that are described herein are for illustrative purposes only and various modifications are changes in light there of will be suggested to persons skilled in the art and are to be included within the spirit and purview of this application and scope of the appended claims and their full scope of equivalents.

What is claimed is:

1. In a data communication network wherein data is transmitted from a first node to a second node, a method for operating said first node, said method comprising:

transmitting data packets from said first node to said second node;

determining when space is available in a retransmission buffer;

storing, said data packets in said retransmission buffer when it is determined that space is available in said retransmission buffed;

holding said data packets in a queue when it is determined that space is not available in said retransmission buffer and space is available in said queue;

discarding said data packets when it is determined that space is not available in said retransmission buffer and space is not available in said queue; and receiving bitmap information from said second node that identifies packets to be retransmitted.

2. The method of claim 1 further comprising: retransmitting said packets identified by said bitmap information to said second node.

3. The method of claim 1 wherein said data communication network comprises a point to multipoint network.

4. The method of claim 3 wherein transmitting comprises: transmitting employing a DOCSIS MAC protocol.

5. In a data communication network wherein data is transmitted from a first node to a second node, apparatus for operating said first node, said apparatus comprising:

means for transmitting data packets from said first node to said second node;

means for determining when space is available in a retransmission buffer;

means for storing said data packets in said retransmission buffer when it is determined that space is available in said retransmission buffer;

means for holding said data packets in a queue when it is determined that space is not available in said retransmission buffer and space is available in said queue;

means for discarding said data packets when it is determined that space is not available in said retransmission buffer and space is not available in said queue;

and means for receiving bitmap information from said second node that identifies packets to be retransmitted.

6. The apparatus of claim 5 further comprising: means for retransmitting said packets identified by said bitmap information to said second node.

7. The apparatus of claim 5 wherein said data communication network comprises a point to multipoint network.

8. The apparatus of claim 7 wherein said means for transmitting comprises: means for transmitting employing a DOCSIS MAC protocol.

9. In a data communication network wherein data is transmitted from a first node to a second node, a computer program product on computer-readable storage medium for operating said first node, said apparatus comprising:

code that transmits data packets from said first node to said second node;

code that determines when space is available in a retransmission buffer;

code that stores said data packets in said retransmission buffer when it is determined that space is available in said retransmission buffer;

code that holds said data packets in a queue when it is determined that space is not available in said retransmission buffer and space is available in said queue;

code that discards said data packets when it is determined that space is not available in said retransmission buffer and space is not available in said queue;

code that receives bitmap information from said second node that identifies packets to be retransmitted; and a computer-readable storage medium that stores the codes.

10. The computer program product on computer readable-storage medium of claim 9 further comprising: code that retransmits said packets identified by said bitmap information to said second node.

11. The computer program product on computer readable-storage medium of claim 9 wherein said data communication network comprises a point to multipoint network.

12. The computer program product on computer readable-storage medium of claim 11 wherein said code that transmits comprises:

code that transmits employing a DOCSIS MAC protocol.

13. The method of claim 2 wherein retransmitting said packets identified by said bitmap information to said second node includes retransmitting said packets until a retry limit is approximately reached.

14. The apparatus of claim 6 wherein said means for retransmitting said packets identified by said bitmap information to said second node include means for retransmitting said packets until a retry limit is approximately reached.

15. The computer program product on computer readable-storage medium of claim 9 wherein said code that retransmits said packets identified by said bitmap information to said second node includes code that retransmits said packets until a retry limit is approximately reached.

16. The method of claim 1 wherein transmitting said data packets from said first node to said second node includes encapsulating said data packets such that a sequence number is appended in a header for each transmitted data packet to facilitate retransmission.

17. The method of claim 5 wherein said means for transmitting comprises means for including a sequence number with each transmitted data packet to facilitate retransmission.

18. The computer program product on computer readable-storage medium of claim 9 wherein said code that transmits comprises code that includes a sequence number with each transmitted data packet to facilitate retransmission.

* * * * *